(12) United States Patent
Zhang et al.

(10) Patent No.: US 12,171,636 B2
(45) Date of Patent: Dec. 24, 2024

(54) BUCCAL TUBE WITH HIDDEN TRACTION HOOK

(71) Applicant: GUANGZHOU OO MEDICAL SCIENTIFIC LIMITED, Guangdong (CN)

(72) Inventors: Qinhui Zhang, Guangdong (CN); Zien Xu, Guangdong (CN)

(73) Assignee: GUANGZHOU OO MEDICAL SCIENTIFIC LIMITED, Guangdong (CN)

( * ) Notice: Subject to any disclaimer, the term of this patent is extended or adjusted under 35 U.S.C. 154(b) by 325 days.

(21) Appl. No.: 17/640,337

(22) PCT Filed: Sep. 23, 2020

(86) PCT No.: PCT/CN2020/116967
§ 371 (c)(1),
(2) Date: Mar. 4, 2022

(87) PCT Pub. No.: WO2021/057754
PCT Pub. Date: Apr. 1, 2021

(65) Prior Publication Data
US 2022/0338961 A1    Oct. 27, 2022

(30) Foreign Application Priority Data

Sep. 25, 2019   (CN) .......................... 201910911881.5

(51) Int. Cl.
*A61C 7/28*         (2006.01)
(52) U.S. Cl.
CPC .................................. *A61C 7/282* (2013.01)

(58) Field of Classification Search
CPC .............. A61C 7/282; A61C 7/14; A61C 7/12
See application file for complete search history.

(56) References Cited

U.S. PATENT DOCUMENTS 3,748,740 A * 7/1973 Wildman ............... A61C 7/285
433/11
4,781,582 A * 11/1988 Kesling ................. A61C 7/282
433/17

(Continued)

FOREIGN PATENT DOCUMENTS

| CN | 200987705 | 12/2007 |
| CN | 101190150 | 6/2008 |

(Continued)

OTHER PUBLICATIONS

"International Search Report (Form PCT/ISA/210) of PCT/CN2020/116967", mailed on Dec. 21, 2020, with English translation thereof, pp. 1-4.

(Continued)

*Primary Examiner* — Ralph A Lewis
(74) *Attorney, Agent, or Firm* — JCIPRNET (57) ABSTRACT

A buccal tube includesa main body. The main body is provided with a traction hook which can move or rotate relative to the main body, and the main body is internally provided with an accommodation space. When the traction hook is not in use, the traction hook is disposed in the accommodation space. When the traction hook is in use, one end of the traction hook outwardly rotates or moves away from the accommodation space.

13 Claims, 10 Drawing Sheets

(56) References Cited

U.S. PATENT DOCUMENTS

| | | | | | |
|---|---|---|---|---|---|
| 5,993,207 | A | * | 11/1999 | Spencer | A61C 7/282 433/18 |
| 6,241,516 | B1 | * | 6/2001 | Orikasa | A61C 7/282 433/17 |
| 7,837,466 | B2 | * | 11/2010 | Griffith | A61C 7/12 433/17 |
| 9,277,973 | B2 | * | 3/2016 | Damon | A61C 7/287 |
| 2008/0286711 | A1 | * | 11/2008 | Corcoran | A61C 7/282 433/18 |
| 2018/0368948 | A1 | * | 12/2018 | Thomas | A61C 7/282 |

FOREIGN PATENT DOCUMENTS

| | | |
|---|---|---|
| CN | 105213045 | 1/2016 |
| CN | 110584810 | 12/2019 |
| JP | 2007000202 | 1/2007 |
| KR | 20090078229 | 7/2009 |
| WO | 2016130828 | 8/2016 |
| WO | 2018175472 | 9/2018 |

OTHER PUBLICATIONS

"Written Opinion of the International Searching Authority (Form PCT/ISA/237) of PCT/CN2020/116967", mailed on Dec. 21, 2020, pp. 1-4.

"Office Action of China Counterpart Application", issued on Feb. 27, 2024, with English translation thereof, p. 1-p. 10.

\* cited by examiner

FIG. 20

BUCCAL TUBE WITH HIDDEN TRACTION HOOK

CROSS-REFERENCE TO RELATED APPLICATION

This application is a 371 of international application of PCT application serial no. PCT/CN2020/116967, filed on Sep. 23, 2020 which claims the priority benefit of China application no. 201910911881.5, filed on Sep. 25, 2019. The entirety of each of the above mentioned patent applications is hereby incorporated by reference herein and made a part of this specification.

TECHNICAL FIELD

The disclosure relates to the technical field of orthodontic instruments, and in particular, relates to a buccal tube.

DESCRIPTION OF RELATED ART

The buccal tube is an important part of the orthodontic fixed appliance and consists of a hollow tube, a traction hook, and a base plate. Generally, the buccal tube is glued directly onto the anchoring tooth surface or is glued and fixed onto the anchoring tooth surface through a belt ring. The orthodontics arch wire passes through the hollow tube of the buccal tube, and the buccal tube may fix the arch wire. A traction hook is provided on the buccal tube and is configured to allow a rubber band or tension spring to be hooked for intra-maxillary or inter-maxillary traction. Usually, the traction hook is not applied throughout the entire orthodontic cycle, but only used in the early or middle and late stages of the orthodontic treatment. However, the traction hooks set on the buccal tubes currently available on the market are all fixed traction hooks, and at present, the traction hooks cannot be removed when the traction hooks of the buccal tubes are not in use. Due to its functional requirements, the structure of the traction hook may generate irritation to the oral mucosa, and a patient may easily feel foreign body sensation. In addition, the traction hooks currently available on the market all contain a sharp angle structure, which brings discomfort to the patient. In order to reduce patient's foreign body sensation, a buccal tube in which the traction hook may be hidden when not in use is provided, and the discomfort brought to the patient during the use of the buccal tube may be greatly reduced.

SUMMARY

In view of the above technical problems, the disclosure provides a buccal tube with a hidden hook.

The technical solutions adopted by the disclosure to solve the technical problem include the following.

A buccal tube includes a main body. The main body is provided with a traction hook which is movable or rotatable relative to the main body. When the traction hook is not in use, the main body is internally provided with an accommodation space, and the traction hook is disposed in the accommodation space. When the traction hook is in use, one end of the traction hook outwardly rotates or moves away from the accommodation space.

In some preferred embodiments, the main body is provided with a rotating shaft, and the traction hook is rotatably connected to the main body through the rotating shaft.

In some other some preferred embodiments, the accommodation space is an elongated space, one end of the traction hook is inserted into the accommodation space, and the traction hook moves in an extending direction of the accommodation space.

In some preferred embodiments, the main body further includes a limiting member, and the limiting member is configured to limit a rotation angle or movement displacement of the traction hook.

In a further preferred embodiment, the limiting member includes an elastic limiting member.

In some further preferred embodiments, two limiting protrusions are formed on a side surface of the traction hook. When the traction hook is not in use, the elastic limiting member abuts against a side wall of a first limiting protrusion to block the traction hook from rotating or moving. When the traction hook is in use, a force is applied to rotate or move the traction hook, the first limiting protrusion presses the elastic limiting member to deform the elastic limiting member, and the first limiting protrusion then passes over the elastic limiting member. When the traction hook rotates or moves to a use position, the elastic limiting member abuts against a side wall of a second limiting protrusion and blocks the traction hook from rotating or moving continuously.

In some further optimized embodiments, when the traction hook rotates or moves to the use position, two sides of the elastic limiting member respectively abut against the side wall of the first limiting protrusion and the side wall of the second limiting protrusion.

In some other further preferred embodiments, the main body includes the limiting member and the elastic limiting member, the elastic limiting member is disposed in the accommodation space, and a third limiting protrusion is formed on a side surface of the traction hook. When the traction hook is not in use, the elastic limiting member abuts against a side wall of the third limiting protrusion to block the traction hook from rotating. When the traction hook is in use, a force is applied to rotate or move the traction hook, the third limiting protrusion presses the elastic limiting member to deform the elastic limiting member, and the third limiting protrusion then passes over the elastic limiting member. When the traction hook rotates or moves to a use position, the limiting member abuts against the traction hook and blocks the traction hook from rotating or moving continuously.

In some other further optimized embodiments, when the traction hook rotates or moves to the use position, two sides of the third limiting protrusion respectively abut against the elastic limiting member and the limiting member.

In some preferred embodiments, when the traction hook is disposed in the accommodation space, an outer surface of the traction hook matches an outer surface of the main body to form a smooth curved surface.

In a further preferred embodiment, the smooth curved surface is an ellipsoid-shaped surface or a spherical-shaped surface.

In some preferred embodiments, an outer surface of the traction hook is a smooth curved surface.

In some preferred embodiments, when the traction hook is in use, one end of the traction hook facing outside of the main body is in a shape of a hook or a protrusion, and the hook or protrusion is configured to allow a traction accessory to be hooked.

Compared to the related art, the effects of the disclosure include the following. The disclosure provides a buccal tube with a hidden traction hook. The buccal tube includes a main body. The main body is provided with the traction hook which can move or rotate relative to the main body, and the main body is internally provided with an accommodation space. When the traction hook is not in use, the traction hook is disposed in the accommodation space. When the traction hook is in use, the traction hook outwardly rotates or moves away from the accommodation space. A fixed traction hook, which is provided on a conventional buccal tube, is modified into the rotatable or movable traction hook, such that when the traction hook does not need to be used, same is hidden in the accommodation space so as to greatly reduce the irritation of the traction hook to the oral mucosa of a patient to relieve the patient's discomfort. When the traction hook needs to be used, same is rotated or moved and is taken out from the accommodation space, which does not affect the use of the traction hook.

The disclosure is further described in detail in combination with accompanying figures and embodiments.

DESCRIPTION OF THE EMBODIMENTS

Embodiment 1

Figure 1:
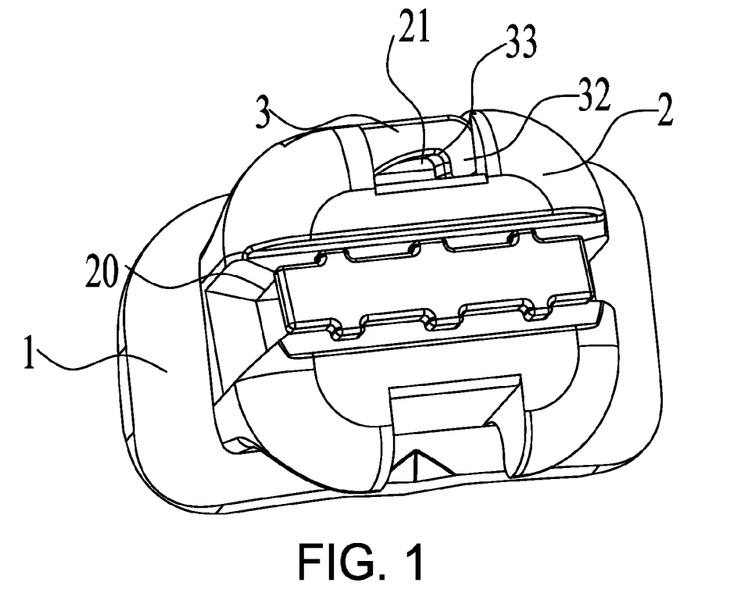
FIG. 1 is a three-dimensional view of a structure of a buccal tube with a traction hook in a hidden state in an embodiment 1.
Figure 2:
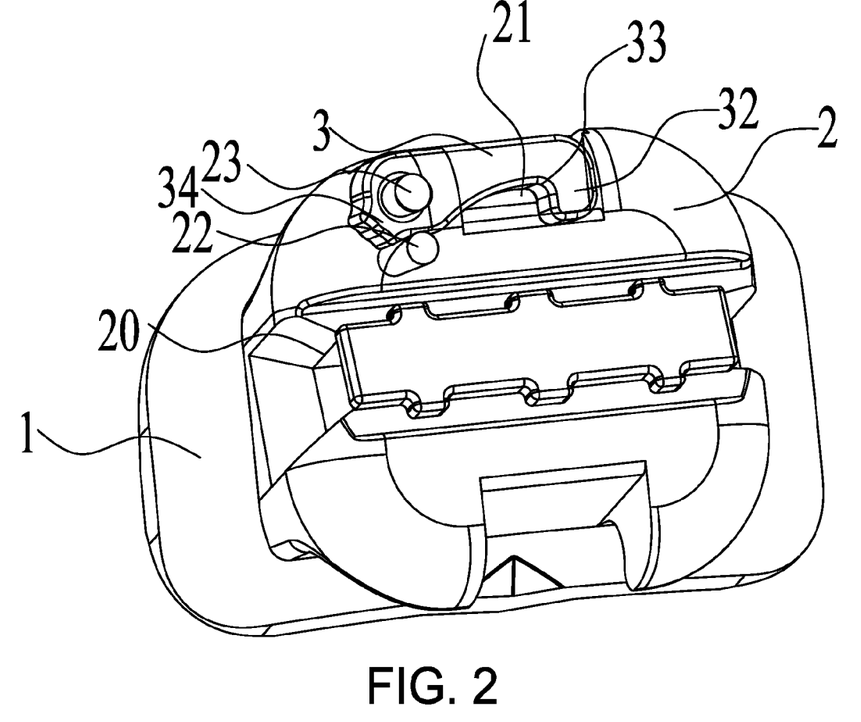
FIG. 2 is a view of an internal structure of the buccal tube with the traction hook in the hidden state in the embodiment 1.

With reference to FIG. 1, FIG. 1 is a three-dimensional view of a structure of a buccal tube with a traction hook in a hidden state in the embodiment 1. This embodiment provides a buccal tube including a bottom plate 1 and a main body 2 connected to each other. The bottom plate 1 is configured for being directly glued onto an anchoring tooth surface or being glued and fixed onto an anchoring tooth surface through a belt, and the bottom plate 1 and the main body 2 are fixedly connected. The main body 2 is provided with a through hole 20 for an arch wire to pass therethrough. A shape of the through hole 20 may be a round hole or a square hole known in the market, or may be a hole formed by combining a through slot and a cover plate. In this embodiment, the through hole 20 is a hole formed by the combination of the through slot and the cover plate. The main body 2 is provided with a traction hook 3 that can rotate relative thereto. In order to show the structure of the buccal tube conveniently, FIG. 2 shows an internal state of the buccal tube when the traction hook is not in use and the main body 2 in FIG. 2 is in a perspective state. As can be seen from FIG. 2, the main body 2 is provided with an accommodation space 21, and when the traction hook 3 is not in use, the traction hook 3 is disposed in the accommodation space 21. The accommodation space 21 may have arbitrary shapes, and in this embodiment, the shape of the accommodation space 21 matches a shape of the traction hook 3. The accommodation space 21 and the through hole 20 may or may not communicate with each other, and in this embodiment, the accommodation space 21 does not communicate with the through hole 20. When the traction hook 3 is disposed in the accommodation space 21, an outer surface of the traction hook 3 matches an outer surface of the main body 2 to form a smooth curved surface. In this embodiment, the outer surface of the traction hook 3 matches the outer surface of the main body 2 to form a smooth curved surface similar to a semi-cylindrical surface. The buccal tubes currently available on the market are all semi-cylindrical, two ends which the through hole penetrates therethrough have sharp structures, and the traction hook also has a sharp structure, which may cause a patient to have a strong foreign body sensation, and the patient may thereby experience a poor using experience. The traction hook provided by this embodiment may be hidden, and the outer surface of the buccal tube forms a smooth curved surface, so that the patient may enjoy an improved using experience.

Figure 3:
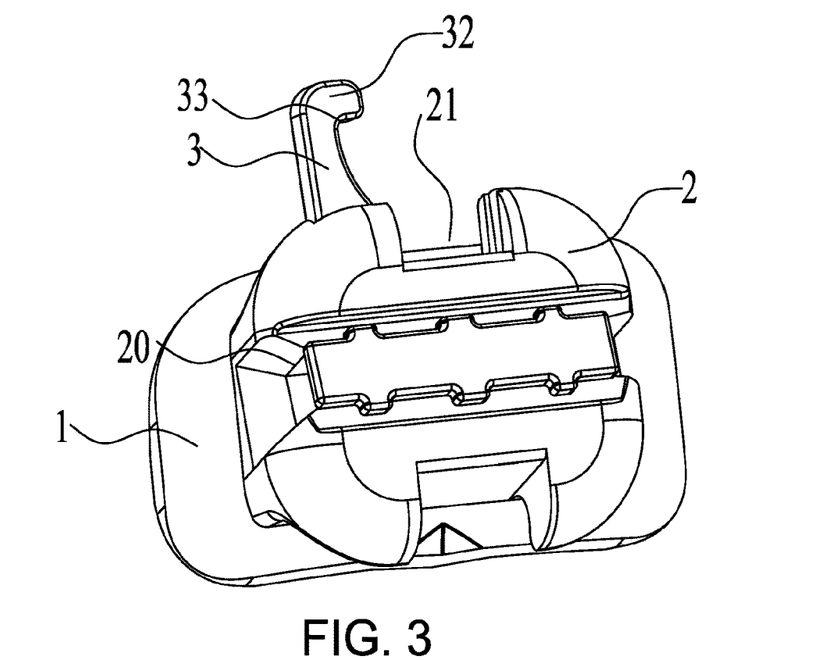
FIG. 3 is a three-dimensional view of the structure of the buccal tube when the traction hook is in use in the embodiment 1.
Figure 4:
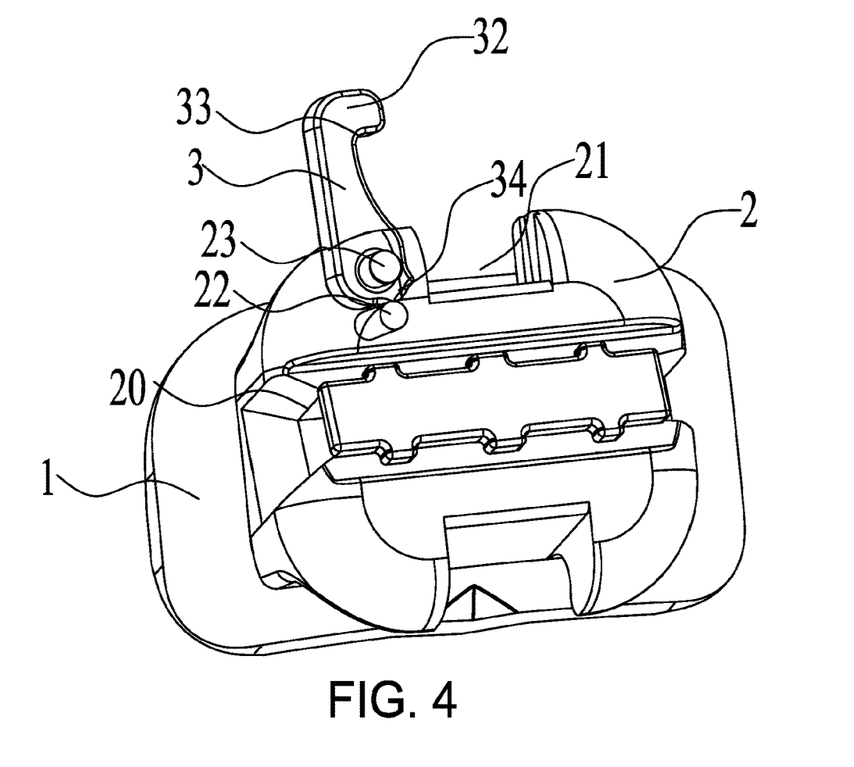
FIG. 4 is a view of the internal structure of the buccal tube when the traction hook is in use in the embodiment 1.

With reference to FIG. 3 to FIG. 4, FIG. 3 is a three-dimensional view of the structure of the buccal tube when the traction hook is in use in the embodiment 1, and FIG. 4 is a view of the internal structure of the buccal tube when the traction hook is in use in the embodiment 1. The main body 2 further includes a limiting member 24, and the limiting member 24 is configured to limit a rotation angle of the traction hook 3. The limiting member 24 is fixedly connected to the main body 2, and in this embodiment, the limiting member 24 and the main body 2 are integrally formed. When the traction hook 3 rotates to a use position, the limiting member 24 abuts against the traction hook 3 to block the traction hook 3 from rotating further. The limiting member 24 limits a maximum rotation angle of the traction hook 3.

The main body 2 further includes an elastic limiting member 22 disposed in the accommodation space 21, and the elastic limiting member 22 contacts a side surface of the traction hook 3. The elastic limiting member 22 may have arbitrary shapes, and preferably, the surface of the elastic limiting member 22 in contact with the traction hook 3 is a smooth curved surface. In this embodiment, the elastic limiting member 22 is a cylindrical rod. The main body 2 is provided with holes for allowing both ends of the elastic limiting member 22 to be inserted, both ends of the elastic limiting member 22 are respectively inserted into the two holes, and the elastic limiting member 22 may rotate axially.

The side surface of the traction hook 3 is provided with a third limiting protrusion 34. When the traction hook is not in use, the elastic limiting member 22 abuts against a side wall of the third limiting protrusion 34 to block the traction hook 3 from rotating. The elastic limiting member 22 and the third limiting protrusion 34 fix the traction hook 3 to a hidden position, so that the traction hook 3 may not automatically rotate out. When the traction hook 3 is in use, a force is applied to rotate the traction hook 3, and the third limiting protrusion 34 presses the elastic limiting member 22 to deform the elastic limiting member 22. The third limiting protrusion 34 then passes over the elastic limiting member 22, and one end of the traction hook 3 leaves the accommodation space 21.

When the traction hook 3 is required to rotate back to the hidden position, a force is only required to be inwardly applied to rotate the traction hook 3, and the third limiting protrusion 34 presses the elastic limiting member 22 to deform the elastic limiting member 22. The third limiting protrusion 34 may then pass over the elastic limiting member 22, and the traction hook 3 returns to the hidden position.

Figure 5:
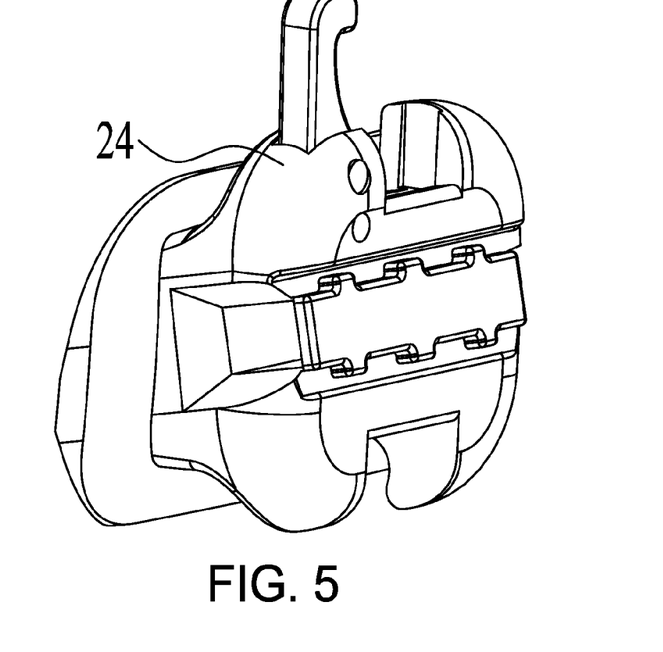
FIG. 5 is a three-dimensional view of the structure of the buccal tube when the traction hook is in use from another viewing angle in the embodiment 1.

One end of the traction hook 3 facing the outside of the main body 2 in use is a free end 32. A recess 33 is formed on a portion of the traction hook 3 near the free end 32, and the recess 33 makes the free end 32 bulge, which may be configured for hanging a rubber band or a pulling band and the like. An outer surface of the free end 32 has a smooth transition and does not contain sharp corners, which may greatly reduce the irritation of the traction hook 3 to the patient's oral mucosa, and food may not be easily hooked.

The traction hook is configured to allow a rubber band or tension spring to be hooked for intra-maxillary or inter-maxillary traction. Usually, the traction hook is not applied throughout the entire orthodontic cycle, but only used in the early or middle and late stages of the orthodontic treatment. However, the traction hooks set on the buccal tubes currently available on the market are all fixed traction hooks, and the traction hooks cannot be removed when the traction hooks are not in use. In the buccal tube provided in this embodiment, the fixed traction hook of the conventional buccal tube is replaced with a movable traction hook. When the traction hook 3 is not required to be used, the traction hook 3 is hidden in the accommodation space 21 inside the main body 2, and the traction hook 3 is pulled out of the accommodation space 21 when it is required to be used. The patient may not feel uncomfortable when the traction hook 3 is not in use in this way.

All the traction hooks of the buccal tubes on the market are hooks formed by bending the cylindrical bodies. On the one hand, these traction hooks contain a sharp angle structure, which may easily stimulate the oral mucosa of the patient, resulting in a strong foreign body sensation and discomfort. On the other hand, during the patient's eating process, these traction hooks easily cause the food to be hooked, resulting in inconvenience for the patient when eating. One end of the traction hook 3 facing the outside of the main body 2 in use is the free end 32. The fee end 32 bulges, and the outer surface of the free end 32 has a smooth transition and does not contain sharp corners, which may greatly reduce the irritation of the traction hook 3 to the patient's oral mucosa, and food may not be easily hooked.

Embodiment 2

Figure 6:
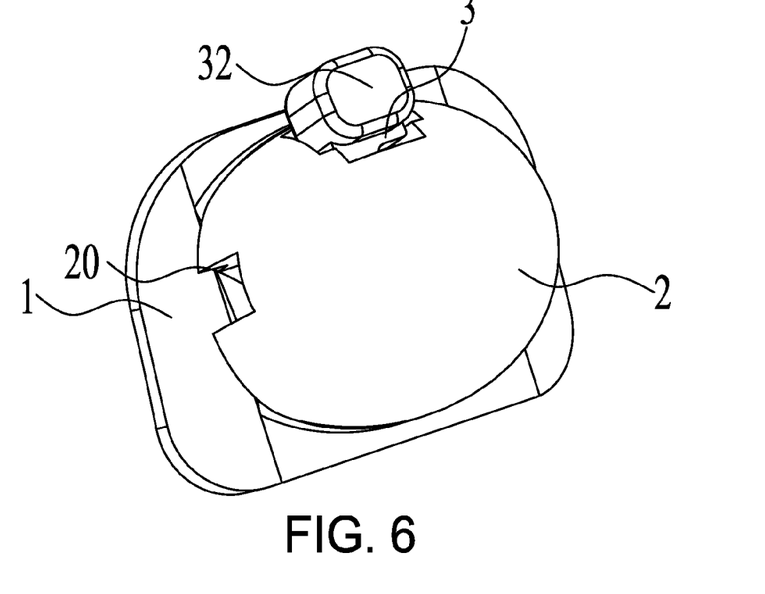
FIG. 6 is a three-dimensional view of a structure of a buccal tube with a traction hook in a hidden state in an embodiment 2.
Figure 7:
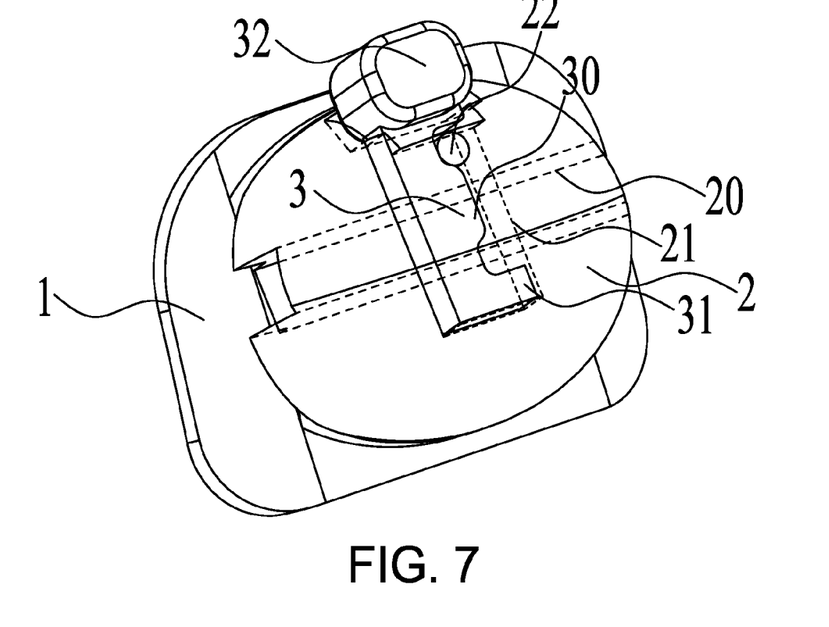
FIG. 7 is a view of an internal structure of the buccal tube with the traction hook in the hidden state in the embodiment 2.

With reference to FIG. 6, FIG. 6 is a three-dimensional view of a structure of a buccal tube with a traction hook in a hidden state in the embodiment 2. This embodiment provides a buccal tube including a bottom plate 1 and a main body 2 connected to each other. The bottom plate 1 is configured for being directly glued onto an anchoring tooth surface or being glued and fixed onto an anchoring tooth surface through a belt, and the bottom plate 1 and the main body 2 are fixedly connected. The main body 2 is provided with a through hole 20 for an arch wire to pass through. A shape of the through hole 20 may be a round hole or a square hole known in the market, or may be a hole formed by combining a through slot and a cover plate. In this embodiment, the through hole 20 is a square hole. The main body 2 is provided with a traction hook 3 that can move relative thereto. FIG. 1 shows a state of the buccal tube when the traction hook is not in use. In order to conveniently show the structure of the buccal tube, the main body 2 shown in FIG. 7 is in a perspective state, and the dotted line shows an internal structure of the main body 2. As can be seen from FIG. 7, the main body 2 is provided with an accommodation space 21, and the traction hook 3 is disposed in the accommodation space 21 when the traction hook 3 is not in use. The accommodation space 21 may have arbitrary shapes, and in this embodiment, the accommodation space 21 is an elongated strip space. The accommodation space 21 is located above the through hole 20. The accommodation space 21 and the through hole 20 may or may not communicate with each other, and in this embodiment, the accommodation space 21 communicates with the through hole 20.

The main body 2 is provided with an elastic limiting member 22 in the accommodation space 21, the elastic limiting member 22 is configured to limit movement and displacement of the traction hook 3, and the elastic limiting member 22 contacts a side surface of the traction hook 3.

Figure 8:
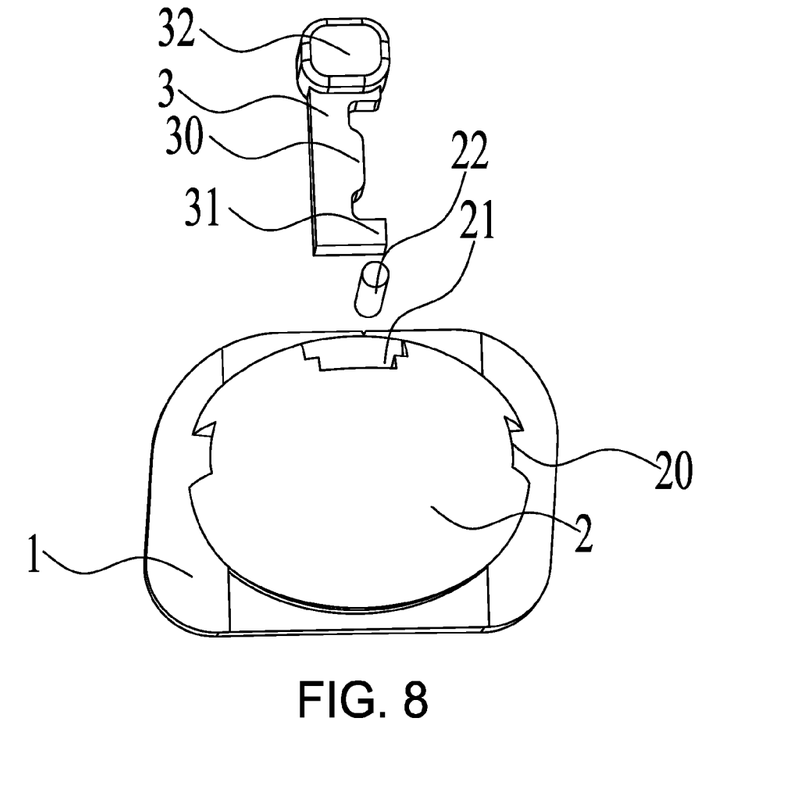
FIG. 8 is an exploded view of the structure of the buccal tube in the embodiment 2.

With reference to FIG. 8, FIG. 8 is an exploded view of the structure of the buccal tube in the embodiment 2. The elastic limiting member 22 may have arbitrary shapes, and preferably, the surface of the elastic limiting member 22 in contact with the traction hook 3 is a smooth curved surface. In this embodiment, the elastic limiting member 22 is a cylindrical rod. The main body 2 is provided with holes for allowing both ends of the elastic limiting member 22 to be inserted, both ends of the elastic limiting member 22 are respectively inserted into the two holes, and the elastic limiting member 22 may rotate axially.

Two limiting protrusions are formed on the side surface of the traction hook 3, namely, a first limiting protrusion 30 and a second limiting protrusion 31. When the traction hook is not in use, the elastic limiting member 22 abuts against a side wall of the first limiting protrusion 30 to block the traction hook 3 from moving. The first limiting protrusion 30 may fix the traction hook 3 to a hidden position, so that the traction hook 3 is prevented from automatically falling out.

When the traction hook 3 is in use, a force is applied to pull one end of the traction hook 3 facing an outer side of the main body 2, and the first limiting protrusion 30 presses the elastic limiting member 22 to deform the elastic limiting member 22. The first limiting protrusion 30 then passes over the elastic limiting member 22, and one end of the traction hook 3 leaves the accommodation space 21.

Figure 9:
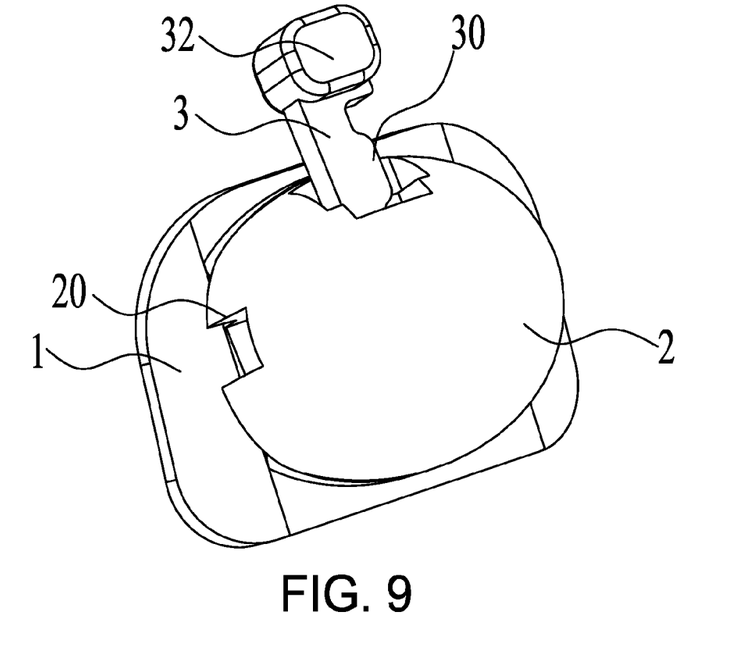
FIG. 9 is a three-dimensional view of the structure of the buccal tube when the traction hook is in use in the embodiment 2.
Figure 10:
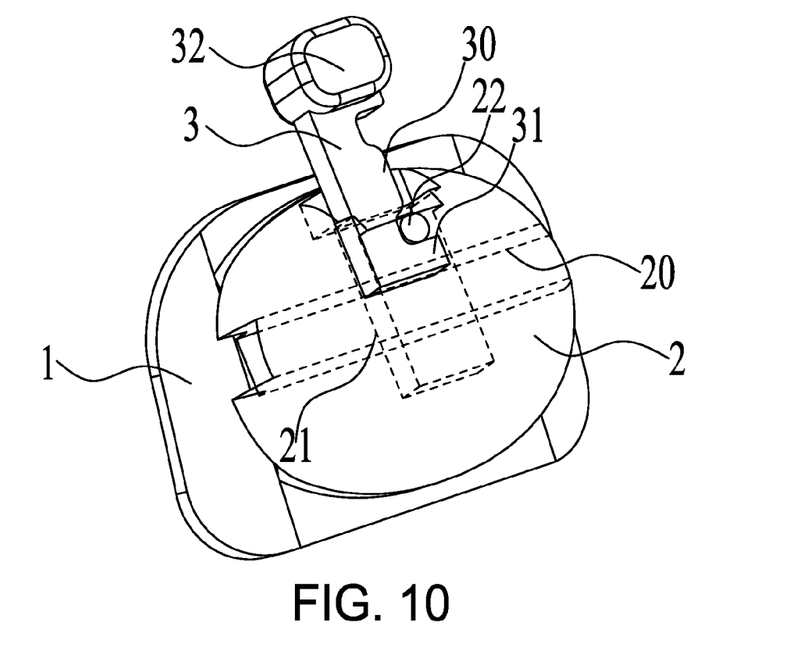
FIG. 10 is a view of the internal structure of the buccal tube when the traction hook is in use in the embodiment 2.

With reference to FIG. 9 to FIG. 10, FIG. 9 is a three-dimensional view of the structure of the buccal tube when the traction hook is in use in the embodiment 2, and FIG. 10 is a view of the internal structure of the buccal tube when the traction hook is in use in the embodiment 2. In order to conveniently show the internal structure, the main body 2 in FIG. 10 is in a perspective state. When the traction hook 3 moves to a use position, the elastic limiting member 22 abuts against a side wall of the second limiting protrusion 31 to block the traction hook 3 from moving continuously. The second limiting protrusion 31 controls maximum displacement of the traction hook 3. In order to better fix the traction hook 3 to the use position, when the traction hook 3 moves to the use position, the two sides of the elastic limiting member 22 respectively abut against the side wall of the first limiting protrusion 30 and the side wall of the second limiting protrusion 31. That is, the first limiting protrusion 30 and the second limiting protrusion 31 clamp the elastic limiting member 22.

The traction hook is configured to allow a rubber band or tension spring to be hooked for intra-maxillary or inter-maxillary traction. Usually, the traction hook is not applied throughout the entire orthodontic cycle, but only used in the early or middle and late stages of the orthodontic treatment. However, the traction hooks set on the buccal tubes currently available on the market are all fixed traction hooks, and the traction hooks cannot be removed when the traction hooks are not in use. In the buccal tube provided in this embodiment, the fixed traction hook of the conventional buccal tube is changed to a movable traction hook. When the traction hook 3 is not required to be used, the traction hook 3 is hidden in the accommodation space 21 inside the main body 2, and the traction hook 3 is pulled out of the accommodation space 21 when it is required to be used. A patient may not feel uncomfortable when the traction hook 3 is not in use in this way.

All the traction hooks of the buccal tubes on the market are hooks formed by bending the cylindrical bodies. On the one hand, these traction hooks contain a sharp angle structure, which may easily stimulate the oral mucosa of the patient, resulting in a strong feeling of presence of a foreign object and discomfort. On the other hand, during the patient's eating process, these traction hooks easily cause the food to be hooked, resulting in inconvenience for the patient when eating. One end of the traction hook 3 facing the outside of the main body 2 in use is the free end 32. The fee end 32 bulges, and the outer surface of the free end 32 has a smooth transition and does not contain sharp corners, which may greatly reduce the irritation of the traction hook 3 to the patient's oral mucosa, and food may not be easily hooked.

Embodiment 3

Figure 11:
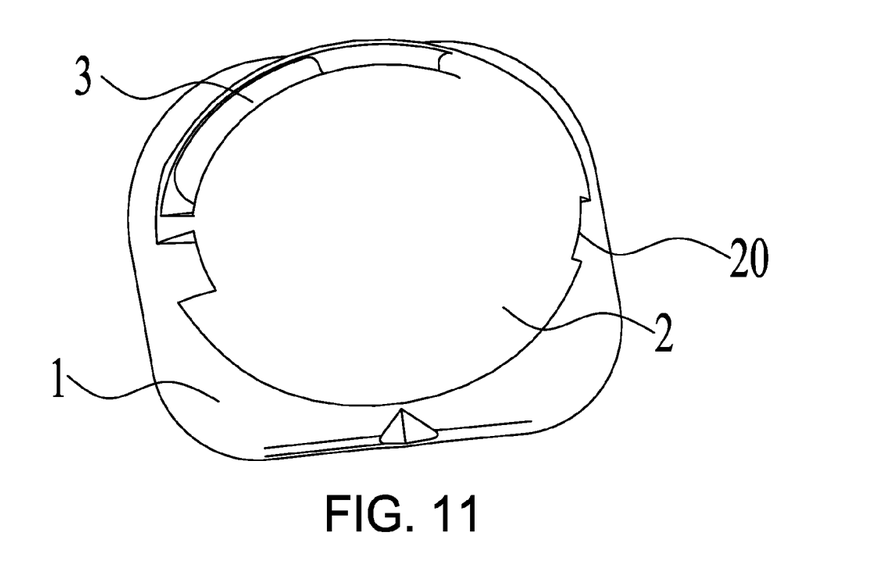
FIG. 11 is a three-dimensional view of a structure of a buccal tube with a traction hook in a hidden state in an embodiment 3.
Figure 12:
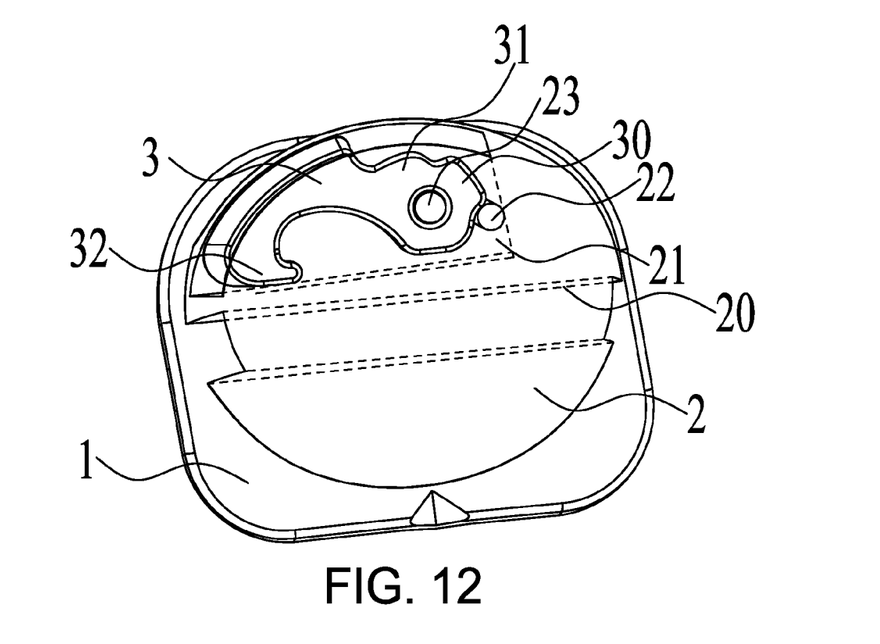
FIG. 12 is a view of an internal structure of the buccal tube with the traction hook in the hidden state in the embodiment 3.

With reference to FIG. 11, FIG. 11 is a three-dimensional view of a structure of a buccal tube with a traction hook in a hidden state in the embodiment 3. This embodiment provides a buccal tube including a bottom plate 1 and a main body 2 connected to each other. The bottom plate 1 is configured for being directly glued or fixed onto an anchoring tooth surface, the bottom plate 1 may also be a common belt, and the bottom plate 1 and the main body 2 are fixedly connected. The main body 2 is provided with a through hole 20 for an arch wire to pass through. A shape of the through hole 20 may be a round hole or a square hole known in the market, or may be a through hole formed by combining a through slot and a cover plate. In this embodiment, the through hole 20 is a square hole. The main body 2 is provided with a traction hook 3 that can rotate relative to it. FIG. 11 shows the state of the buccal tube when the traction hook is not in use, and FIG. 12 is a view of an internal structure of the buccal tube when the traction hook is hidden in the embodiment 3. In order to conveniently show the structure of the buccal tube, the main body 2 shown in FIG. 12 is in a perspective state. The dotted line shows an internal structure of the main body 2. As can be seen from FIG. 12, the main body 2 is provided with an accommodation space 21, and the traction hook 3 is disposed in the accommodation space 21 when the traction hook 3 is not in use. The accommodation space 21 may have arbitrary shapes, and in this embodiment, the shape of the accommodation space 21 matches a shape of the traction hook 3 and is shaped as an arc-shaped space.

When the traction hook 3 is disposed in the accommodation space 21, an outer surface of the traction hook 3 matches an outer surface of the main body 2 to form a smooth curved surface. The smooth curved surface may be any smooth shape, and preferably, the surface may selectively be an ellipsoid-like surface or a spherical-like surface. In this embodiment, the smooth curved surface is shaped as an ellipsoid-like shape. The outer surface of the traction hook 3 matches the outer surface of the main body 2 to form a smooth curved surface, so that irritation generated by the buccal tube to the oral mucosa of a patient is greatly reduced, and the patient may thus feel less discomfort.

The main body is provided with a rotating shaft 23, and the traction hook 3 is rotatably connected to the main body 2 through the rotating shaft 23. A direction of the rotating shaft 23 may be set arbitrarily, and in this embodiment, the rotating shaft 23 is perpendicular to the bottom plate 1.

The main body 2 is provided with an elastic limiting member 22 in the accommodation space 21, the elastic limiting member 22 is configured to limit a rotation angle of the traction hook 3, and the elastic limiting member 22 contacts a side surface of the traction hook 3.

Figure 13:
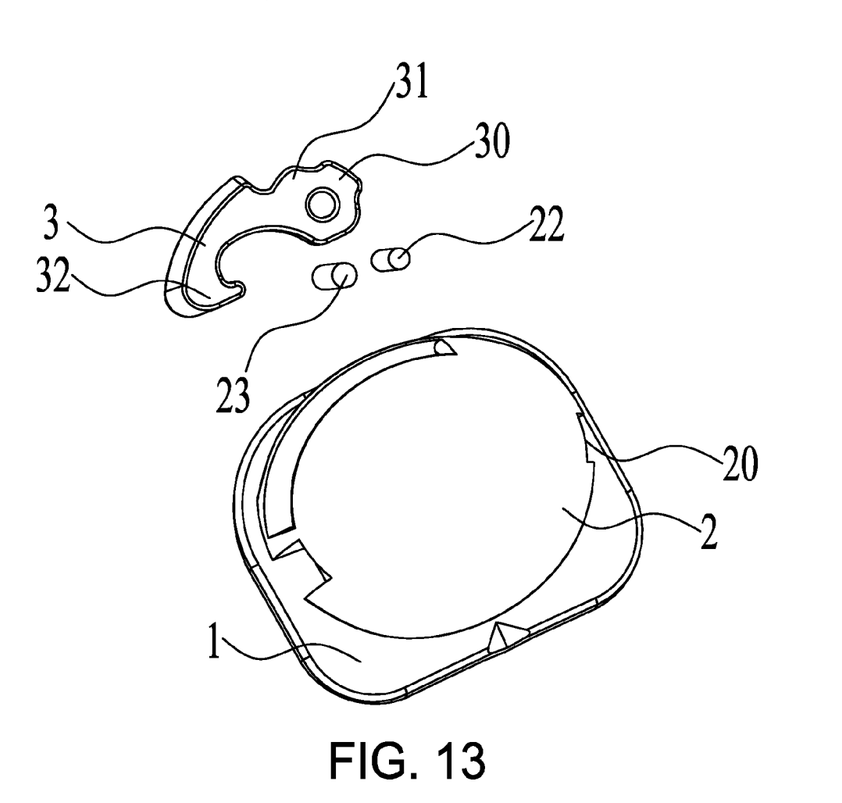
FIG. 13 is an exploded view of the structure of the buccal tube in the embodiment 3.

With reference to FIG. 13, FIG. 13 is an exploded view of the structure of the buccal tube in the embodiment 3. The end of the traction hook 3 facing the outside of the main body 2 in use is a free end 32. The free end 32 is in the shape of a hook, and the outer surface of the end of the traction hook 3 facing the outside of the main body 2 is in the shape of a smooth curved surface. The outer surface of the traction hook 3 has a smooth transition and does not contain sharp corners, which may greatly reduce the irritation of the traction hook 3 to the patient's oral mucosa, and food may not be easily hooked. A shape of the elastic limiting member 22 may be arbitrary, and preferably, the surface of the elastic limiting member 22 in contact with the traction hook 3 is a smooth curved surface. In this embodiment, the elastic limiting member 22 is a cylindrical rod, and the main body 2 is fixedly connected to the elastic limiting member 22.

Two limiting protrusions are formed on the side surface of the traction hook 3, namely, a first limiting protrusion 30 and a second limiting protrusion 31. When the traction hook is not in use, the elastic limiting member 22 abuts against a side wall of the first limiting protrusion 30 to block the traction hook 3 from rotating. The first limiting protrusion 30 and the elastic limiting member 22 may fix the traction hook 3 to a hidden position, so that the traction hook 3 is prevented from automatically rotating out. When the traction hook 3 is in use, a force is applied to rotate one end of the traction hook 3 facing an outer side of the main body 2, and the first limiting protrusion 30 presses the elastic limiting member 22 to deform the elastic limiting member 22. The first limiting protrusion 30 then passes over the elastic limiting member 22, and one end of the traction hook 3 leaves the accommodation space 21.

Figure 14:
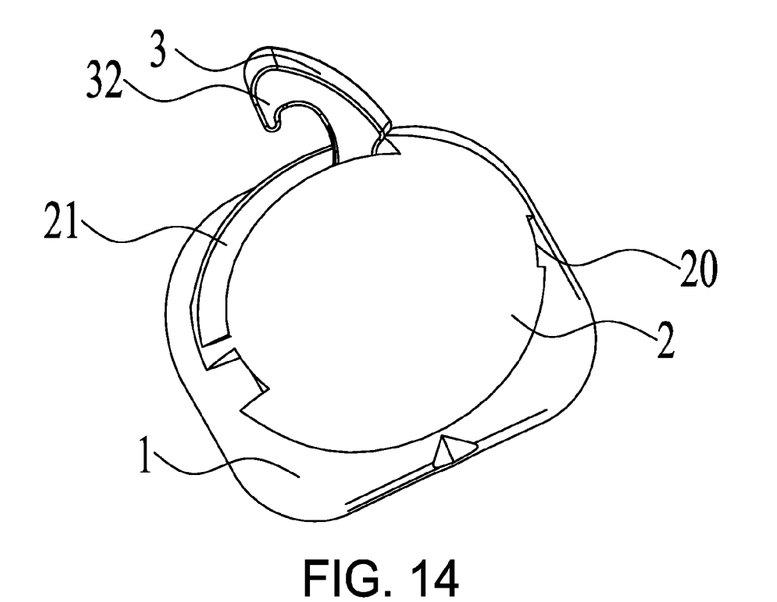
FIG. 14 is a three-dimensional view of the structure of the buccal tube when the traction hook is in use in the embodiment 3.
Figure 15:
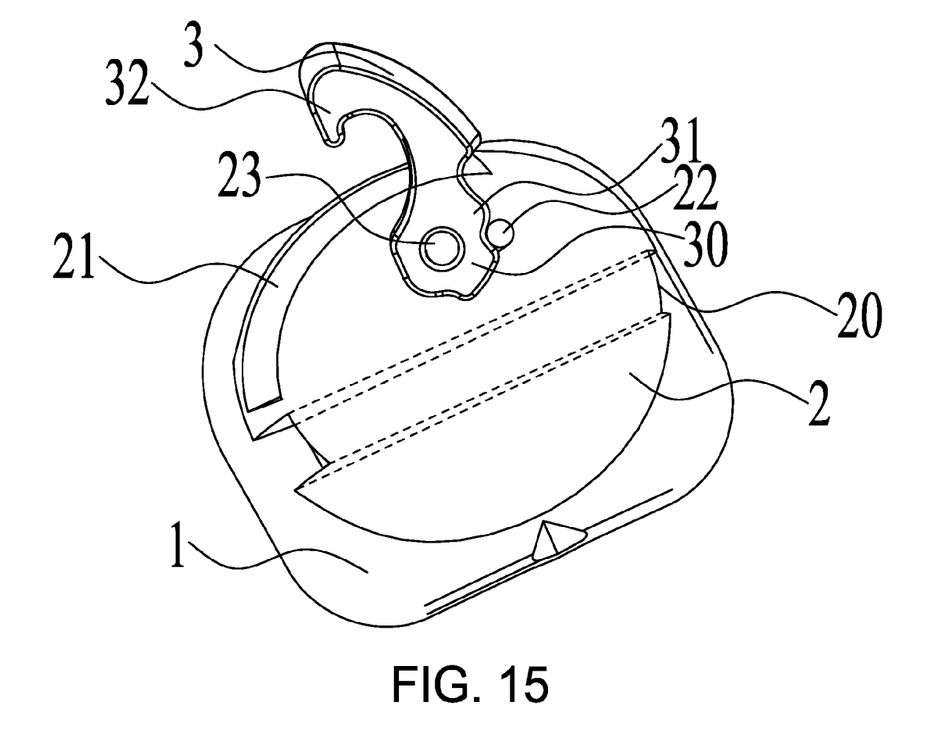
FIG. 15 is a view of the internal structure of the buccal tube when the traction hook is in use in the embodiment 3.

With reference to FIG. 14 to FIG. 15, FIG. 14 is a three-dimensional view of the structure of the buccal tube when the traction hook is in use in the embodiment 3, and FIG. 15 is a view of the internal structure of the buccal tube when the traction hook is in use in the embodiment 3. In order to conveniently show the internal structure, the main body 2 in FIG. 15 is in a perspective state. When the traction hook 3 rotates to a use position, the elastic limiting member 22 abuts against a side wall of the second limiting protrusion 31 to block the traction hook 3 from rotating continuously. The second limiting protrusion 31 limits a maximum rotation angle of the traction hook 3. In order to better fix the traction hook 3 to the use position, when the traction hook 3 rotates to the use position, the two sides of the elastic limiting member 22 respectively abut against the side wall of the first limiting protrusion 30 and the side wall of the second limiting protrusion 31. That is, the first limiting protrusion 30 and the second limiting protrusion 31 clamp the elastic limiting member 22.

Embodiment 4

Figure 16:
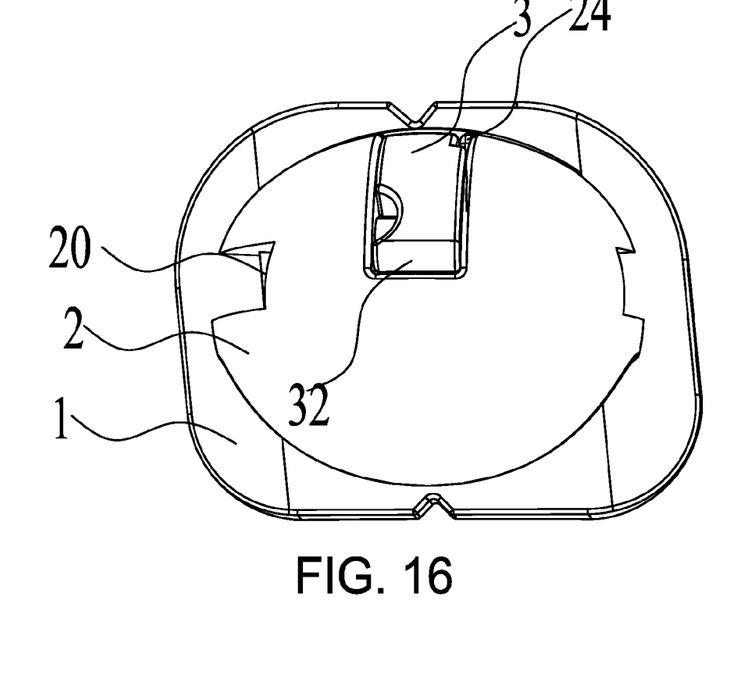
FIG. 16 is a three-dimensional view of a structure of a buccal tube with a traction hook in a hidden state in an embodiment 4.

With reference to FIG. 16, FIG. 16 is a three-dimensional view of a structure of a buccal tube with a traction hook in a hidden state in the embodiment 4. This embodiment provides a buccal tube including a bottom plate 1 and a main body 2 connected to each other. The bottom plate 1 is configured for being directly glued onto an anchoring tooth surface or being glued and fixed on to an anchoring tooth surface through a belt, and the bottom plate 1 and the main body 2 are fixedly connected. The main body 2 is provided with a through hole 20 for an arch wire to pass through. A shape of the through hole 20 may be a round hole or a square hole known in the market, or may be a through hole formed by combining a through slot and a cover plate. In this embodiment, the through hole 20 is a square hole. The main body 2 is provided with a traction hook 3 that can rotate relative to it.

When the traction hook 3 is disposed in the accommodation space 21, an outer surface of the traction hook 3 matches an outer surface of the main body 2 to form a smooth curved surface. The smooth curved surface may be any smooth shape, and preferably, the surface may selectively be an ellipsoid-shaped surface or a spherical-shaped surface. In this embodiment, the smooth curved surface is shaped as an ellipsoid-shaped shape. The outer surface of the traction hook 3 matches the outer surface of the main body 2 to form a smooth curved surface, so that irritation generated by the buccal tube to the oral mucosa of a patient is greatly reduced, and the patient may thus feel less discomfort.

Figure 17:
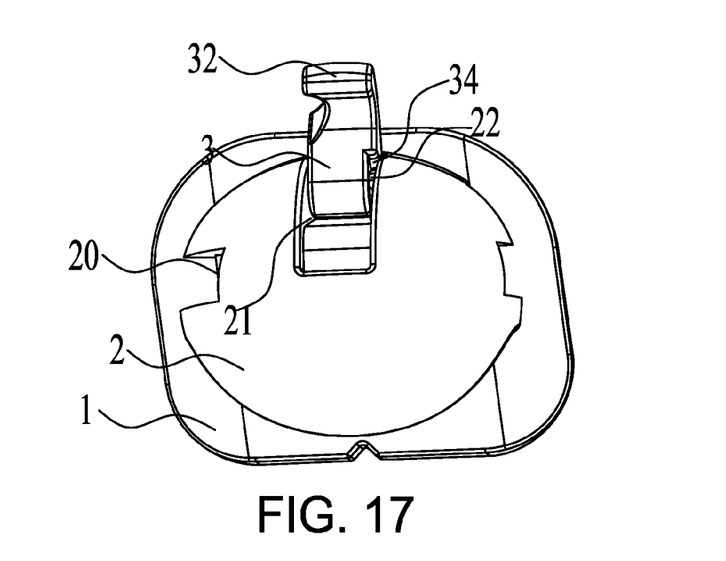
FIG. 17 is a three-dimensional view of the structure of the buccal tube when the traction hook is in use in the embodiment 4.

With reference to FIG. 17, FIG. 17 is a three-dimensional view of the structure of the buccal tube when the traction hook is in use in the embodiment 4. As can be seen from FIG. 17, the main body 2 is provided with an accommodation space 21, and the traction hook 3 is disposed in the accommodation space 21 when the traction hook 3 is not in use. The accommodation space 21 may have arbitrary shapes, and in this embodiment, the shape of the accommodation space 21 matches a shape of the traction hook 3. When the traction hook 3 is in use, the traction hook 3 may be used by rotating the traction hook 3 with a tool such as a hook.

Figure 18:
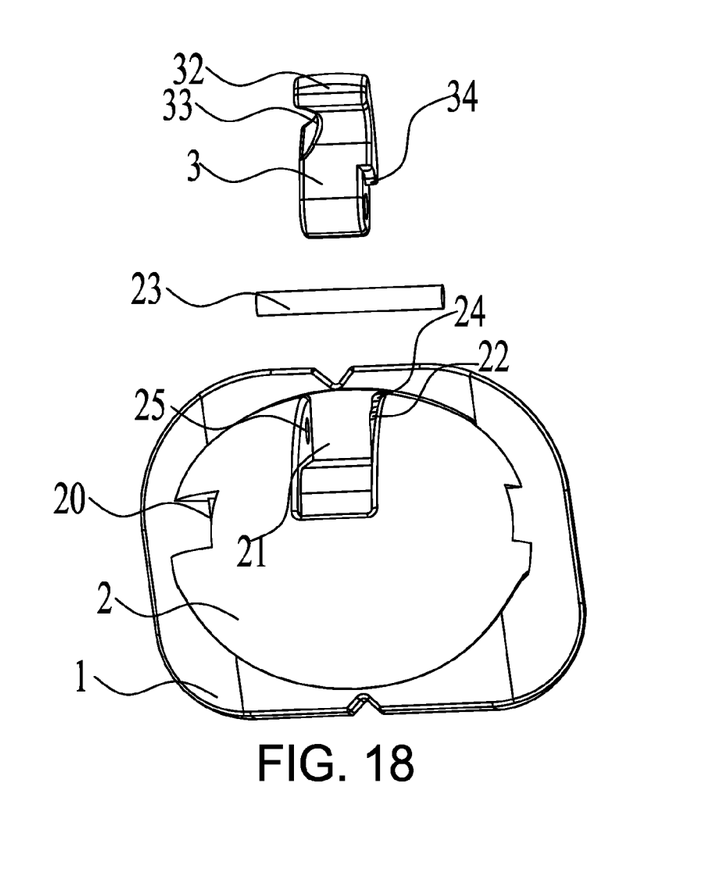
FIG. 18 is an exploded view of the structure of the buccal tube in the embodiment 4.

With reference to FIG. 18, FIG. 18 is an exploded view of the structure of the buccal tube in the embodiment 4. The main body is provided with a rotating shaft 23, and the traction hook 3 is rotatably connected to the main body 2 through the rotating shaft 23. A direction of the rotating shaft 23 may be set arbitrarily, and in this embodiment, the rotating shaft 23 is parallel to the bottom plate 1. The main body 2 is provided with holes 25 into which both ends of the rotating shaft 23 are inserted. Both ends of the rotating shaft 23 are inserted into the hole 25, and the rotating shaft 23 may rotate around an axis in the hole 25.

The main body 2 further includes a limiting member 24 disposed in the accommodation space 21, and the limiting member 24 is configured to limit a rotation angle of the traction hook 3. The limiting member 24 is fixedly connected to the main body 2, and in this embodiment, the limiting member 24 and the main body 2 are integrally formed. When the traction hook 3 rotates to a use position, the limiting member 24 abuts against the traction hook 3 to block the traction hook 3 from rotating further. The limiting member 24 limits a maximum rotation angle of the traction hook 3.

One end of the traction hook 3 facing the outside of the main body 2 in use is a free end 32. A recess 33 is formed on a portion of the traction hook 3 near the free end 32, and the recess 33 makes the free end 32 bulge, which may be configured for hanging a rubber band or a pulling band and the like. An outer surface of the free end 32 has a smooth transition and does not contain sharp corners, which may greatly reduce the irritation of the traction hook 3 to the patient's oral mucosa, and food may not be easily hooked.

The traction hook 3 is disposed on an upper side of the main body 2, and the traction hook 3 may be kept hidden under the action of gravity. The traction hook 3 is hooked out by a hook, and the traction hook 3 may be kept in the use position by traction members such as a rubber band and a tension spring.

In order to further improve the solution, regarding fixing of the traction hook 3 to a hidden position and the use position, an optimized implementation is introduced below.

Figure 19:
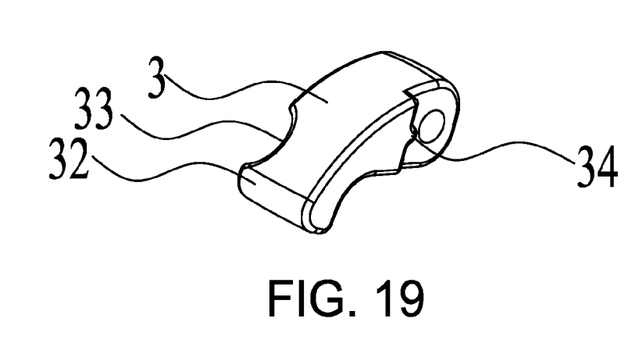
FIG. 19 is a three-dimensional view of the structure of the buccal tube in the embodiment 4.
Figure 20:
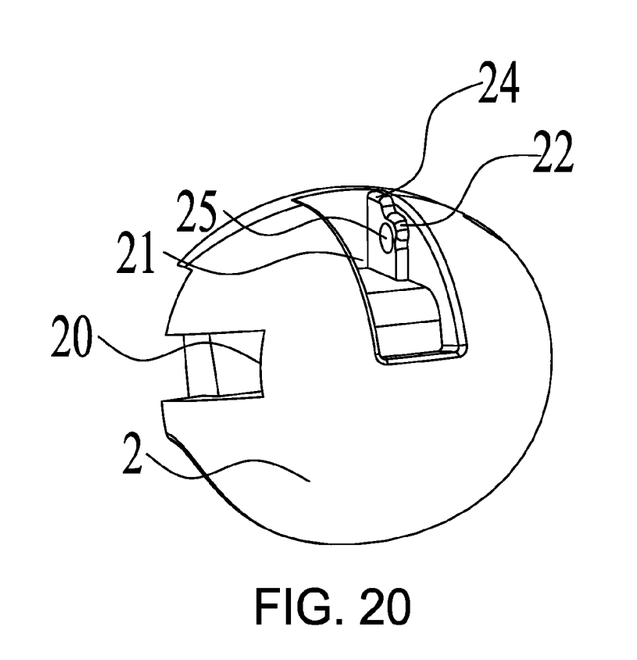
FIG. 20 is a three-dimensional view of a structure of a main body in the embodiment 4.

With reference to FIG. 19 to FIG. 20, FIG. 19 is a three-dimensional view of the structure of the buccal tube in the embodiment 4, and FIG. 20 is a three-dimensional view of a structure of a main body in the embodiment 4. The main body 2 is provided with an elastic limiting member 22 in the accommodation space 21. The side surface of the traction hook 3 is provided with a third limiting protrusion 34. When the traction hook is not in use, the elastic limiting member 22 abuts against a side wall of the third limiting protrusion 34 to block the traction hook 3 from rotating. The elastic limiting member 22 and the third limiting protrusion 34 fix the traction hook 3 to the hidden position, so that the traction hook 3 may not automatically rotate out. When the traction hook 3 is in use, a force is applied to rotate one end of the traction hook 3 facing an outer side of the main body 2, and the third limiting protrusion 34 presses the elastic limiting member 22 to deform the elastic limiting member 22. The third limiting protrusion 34 then passes over the elastic limiting member 22, and one end of the traction hook 3 leaves the accommodation space 21. When the traction hook 3 rotates to the use position, the third limiting protrusion 34 abuts against the limiting member 24 to block the traction hook 3 from rotating further. The limiting member 24 limits a maximum rotation angle of the traction hook 3.

In a further optimized embodiment, when the traction hook 3 rotates to the use position, both sides of the third limiting protrusion 34 respectively abut against the elastic limiting member 22 and the limiting member 24. That is, the elastic limiting member 22 and the limiting member 24 clamp the third limiting protrusion 34 to fix the traction hook 3 to the use position and cannot rotate. When the traction hook 3 is required to rotate back to the hidden position, a force is only required to be inwardly applied to rotate the traction hook 3, and the third limiting protrusion 34 presses the elastic limiting member 22 to deform the elastic limiting member 22. The third limiting protrusion 34 may then pass over the elastic limiting member 22, and the traction hook 3 returns to the hidden position.

The disclosure is not limited to the above-mentioned embodiments. If the various changes or modifications of the disclosure do not depart from the spirit and scope of the disclosure and if these changes and modifications belong to the claims and equivalent technical scope of the disclosure, the disclosure is also intended to include these changes and modifications.

What is claimed is:

1. A buccal tube, adapted to fix an arch wire, the buccal tube comprises
    a main body, wherein the main body is provided with a traction hook which is movable or rotatable relative to the main body, the main body is internally provided with an accommodation space, and the main body is provided with a through hole, the arch wire is passed through the through hole, the accommodation space is separate from the through hole,
    when the traction hook is not in use, the traction hook is disposed in the accommodation space,
    when the traction hook is in use, one end of the traction hook outwardly rotates or moves away from the accommodation space.

2. The buccal tube according to claim 1, wherein the main body is provided with a rotating shaft, and the traction hook is rotatably connected to the main body through the rotating shaft.

3. The buccal tube according to claim 1, wherein the accommodation space is an elongated space, one end of the traction hook is inserted into the accommodation space, and the traction hook moves in an extending direction of the accommodation space.

4. The buccal tube according to claim 1, wherein the main body further comprises a limiting member, and the limiting member is configured to limit a rotation angle or movement displacement of the traction hook.

5. The buccal tube according to claim 4, wherein the limiting member comprises an elastic limiting member.

6. The buccal tube according to claim 5, wherein a first limiting protrusion and a second limiting protrusion are formed on a side surface of the traction hook,
    when the traction hook is not in use, the elastic limiting member abuts against a side wall of a first limiting protrusion to block the traction hook from rotating or moving,
    when the traction hook is in use, a force is applied to rotate or move the traction hook, the first limiting protrusion presses the elastic limiting member to deform the elastic limiting member, and the first limiting protrusion then passes over the elastic limiting member,
    when the traction hook rotates or moves to a use position, the elastic limiting member abuts against a side wall of a second limiting protrusion and blocks the traction hook from rotating or moving continuously.

7. The buccal tube according to claim 6, wherein when the traction hook rotates or moves to the use position, two sides of the elastic limiting member respectively abut against the side wall of the first limiting protrusion and the side wall of the second limiting protrusion.

8. The buccal tube according to claim 5, wherein the main body comprises the limiting member and the elastic limiting member, the elastic limiting member is disposed in the accommodation space, a third limiting protrusion is formed on a side surface of the traction hook,
    when the traction hook is not in use, the elastic limiting member abuts against a side wall of the third limiting protrusion to block the traction hook from rotating,
    when the traction hook is in use, a force is applied to rotate or move the traction hook, the third limiting protrusion presses the elastic limiting member to deform the elastic limiting member, and the third limiting protrusion then passes over the elastic limiting member,
    when the traction hook rotates or moves to a use position, the limiting member abuts against the traction hook and blocks the traction hook from rotating or moving continuously.

9. The buccal tube according to claim 8, wherein when the traction hook rotates or moves to the use position, two sides of the third limiting protrusion respectively abut against the elastic limiting member and the limiting member.

10. The buccal tube according to claim 1, wherein when the traction hook is disposed in the accommodation space, an outer surface of the traction hook matches an outer surface of the main body to form a smooth curved surface.

11. The buccal tube according to claim 10, wherein the smooth curved surface is an ellipsoid-shaped surface or a spherical-shaped surface.

12. The buccal tube according to claim 1, wherein an outer surface of the traction hook is a smooth curved surface.

13. The buccal tube according to claim 1, wherein one end of the traction hook facing outside of the main body is in a shape of a hook or a protrusion when the traction hook is in use, and the hook or protrusion is configured to allow a traction accessory to be hooked.

* * * * *